United States Patent
Kim et al.

(10) Patent No.: US 11,905,637 B2
(45) Date of Patent: Feb. 20, 2024

(54) LAUNDRY TREATMENT MACHINE

(71) Applicant: LG ELECTRONICS INC., Seoul (KR)

(72) Inventors: Sungwan Kim, Seoul (KR); Jieon Kim, Seoul (KR); Jongseok Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 490 days.

(21) Appl. No.: 17/258,330

(22) PCT Filed: Jul. 5, 2019

(86) PCT No.: PCT/KR2019/008294
§ 371 (c)(1),
(2) Date: Jan. 6, 2021

(87) PCT Pub. No.: WO2020/009535
PCT Pub. Date: Jan. 9, 2020

(65) Prior Publication Data
US 2021/0269958 A1    Sep. 2, 2021

(30) Foreign Application Priority Data

Jul. 6, 2018 (KR) .......................... 10-2018-0079043

(51) Int. Cl.
*D06F 33/42* (2020.01)
*D06F 23/04* (2006.01)
(Continued)

(52) U.S. Cl.
CPC .............. *D06F 33/42* (2020.02); *D06F 23/04* (2013.01); *D06F 37/304* (2013.01);
(Continued)

(58) Field of Classification Search
None
See application file for complete search history.

(56) References Cited

U.S. PATENT DOCUMENTS

| | | | |
|---|---|---|---|
| 4,284,943 A | 8/1981 | Rowe | |
| 4,511,312 A | 4/1985 | Hartwig | |

(Continued)

FOREIGN PATENT DOCUMENTS

| | | |
|---|---|---|
| CN | 102710199 | 10/2012 |
| EP | 2781640 | 9/2014 |

(Continued)

OTHER PUBLICATIONS

International Search Report (with English Translation) and Written Opinion (with English Translation) dated Nov. 5, 2019 issued in Application No. PCT/KR2019/008294.

(Continued)

*Primary Examiner* — Cristi J Tate-Sims
(74) *Attorney, Agent, or Firm* — KED & Associates LLP

(57) ABSTRACT

The present disclosure relates to a laundry treatment machine. A drain laundry treatment machine according to an embodiment of the present disclosure: an inverter converting a direct current (DC) voltage from a converter into an alternating current (AC) voltage based on a switching operation and outputting the converted AC voltage to a drain motor; an output current detector to detect an output current flowing in the drain motor; and a controller to control the drain motor to rotate at a speed lower than a first speed when the output current flowing in the drain motor decreases in a state where a speed of the drain motor is the first speed. Accordingly, it is possible to reduce a pressure in a vortex chamber of the drain pump during dewatering.

15 Claims, 14 Drawing Sheets

(51) Int. Cl.
*D06F 37/30* (2020.01)
*H02M 7/5387* (2007.01)
*H02P 27/08* (2006.01)
*D06F 103/48* (2020.01)
*D06F 105/08* (2020.01)
*D06F 105/48* (2020.01)
*D06F 39/08* (2006.01)
*D06F 105/46* (2020.01)
*D06F 103/18* (2020.01)

(52) U.S. Cl.
CPC ........ *H02M 7/53871* (2013.01); *H02P 27/08* (2013.01); *D06F 39/085* (2013.01); *D06F 2103/18* (2020.02); *D06F 2103/48* (2020.02); *D06F 2105/08* (2020.02); *D06F 2105/46* (2020.02); *D06F 2105/48* (2020.02)

(56) References Cited

U.S. PATENT DOCUMENTS

| | | |
|---|---|---|
| 5,563,490 A | 10/1996 | Kawaguchi et al. |
| 2007/0107475 A1 | 5/2007 | Hill |
| 2008/0163930 A1 | 7/2008 | Ha |
| 2017/0302208 A1* | 10/2017 | Je ............................ D06F 33/48 |
| 2018/0073186 A1* | 3/2018 | Choi ........................ D06F 25/00 |

FOREIGN PATENT DOCUMENTS

| | | |
|---|---|---|
| JP | 2001-276485 | 10/2001 |
| JP | 2002-166090 | 6/2002 |
| JP | 2016-123532 | 7/2016 |
| KR | 10-2011-0132942 | 12/2011 |
| KR | 10-1185957 | 9/2012 |
| KR | 10-1756408 | 7/2017 |
| WO | WO 2007/053042 | 5/2007 |

OTHER PUBLICATIONS

European Search Report dated Mar. 22, 2022 issued in Application No. 19831171.4.
Chinese Office Action dated Aug. 3, 2022 issued in Application No. 201980058207.5.

* cited by examiner

LAUNDRY TREATMENT MACHINE

CROSS-REFERENCE TO RELATED PATENT APPLICATIONS

This application is a U.S. National Stage Application under 35 U.S.C. § 371 of PCT Application No. PCT/KR2019/008294, filed Jul. 5, 2019, which claims priority to Korean Patent Application No. 10-2018-0079043, filed Jul. 6, 2018, whose entire disclosures are hereby incorporated by reference.

BACKGROUND OF THE DISCLOSURE

1. Field of the Disclosure

The present disclosure relates to a laundry treatment machine, and more particularly, to a laundry treatment machine capable of reducing a pressure in a vortex chamber of a drain pump during dewatering.

Further, the present disclosure relates to a laundry treatment machine capable of smoothly performing drainage during dewatering.

Further, the present disclosure relates to a laundry treatment machine capable of reducing noise or vibration when a drain pump is operated.

Further, the present disclosure relates to a laundry treatment machine capable of driving a drain pump motor in a sensorless manner.

Further, the present disclosure relates to a laundry treatment machine capable of improving the stability of a converter.

Further, the present disclosure relates to a laundry treatment machine capable of shortening a time required for completion of drainage.

2. Description of the Related Art

A drain pump driving apparatus drains water entering a water A drain pump driving apparatus drives a motor during drainage to drain water entering a water introduction part to the outside.

When using an alternating current (AC) pump motor in order to drive a drain pump, the motor is normally driven by a constant speed operation with an input AC voltage.

For example, when the frequency of the input AC voltage is 50 Hz, the drain pump motor rotates at 3,000 rpm, and, when the frequency of the input AC voltage is 60 Hz, the drain pump motor rotates at 3,600 rpm.

Such an AC pump motor has a drawback such as an extended period of time for completion of drainage because the speed of the motor is not controlled during drainage.

In order to address the drawback, researches are being conducted to apply a direct current (DC) brushless motor as a drain pump motor.

Examples of a drain pump motor based on a DC brushless motor are disclosed in Japanese Patent Application Laid-Open Nos. 2001-276485 and 2002-166090.

In the prior documents, there is a drawback such as an extended period of time for completion of drainage during drainage because speed control is performed when the drain pump motor is controlled.

In addition, these prior documents merely disclose that the speed control is performed when the drain pump motor is controlled, without disclosing a solution to noise or vibration that occurs when a pressure in a vortex chamber of a drain pump increases during dewatering.

SUMMARY

The present disclosure provides a laundry treatment machine capable of reducing a pressure in a vortex chamber of a drain pump during dewatering.

Further, the present disclosure provides a laundry treatment machine capable of smoothly performing drainage during dewatering.

Further, the present disclosure provides a laundry treatment machine capable of reducing noise or vibration when a drain pump is operated.

Further, the present disclosure provides a laundry treatment machine capable of driving a drain pump motor in a sensorless manner.

Further, the present disclosure provides a laundry treatment machine capable of improving the stability of a converter.

Further, the present disclosure provides a laundry treatment machine capable of shortening a time required for completion of drainage.

An embodiment of the present disclosure provides a laundry treatment machine including: an inverter converting a direct current (DC) voltage from a converter into an alternating current (AC) voltage based on a switching operation and outputting the converted AC voltage to a drain motor; an output current detector to detect an output current flowing in the drain motor; and a controller to control the drain motor to rotate at a speed lower than a first speed when the output current flowing in the drain motor decreases in a state where a speed of the drain motor is the first speed.

In the laundry treatment machine according to an embodiment of the present disclosure, when the output current flowing in the drain motor decreases, the controller may increase the speed of the drain motor when a predetermined time elapses after the drain motor is driven at a second speed lower than the first speed.

In the laundry treatment machine according to an embodiment of the present disclosure, the controller may control the speed of the drain motor to be decreased and increased repeatedly until dewatering is completed.

In the laundry treatment machine according to an embodiment of the present disclosure, when the output current flowing in the drain motor increases when the drain motor is driven at a speed lower than the first speed, the controller may control the speed of the drain motor to be increased.

In the laundry treatment machine according to an embodiment of the present disclosure, the controller may control a power of the drain motor when driven at the first speed to be the same as that of the drain motor when driven at the second speed.

In the laundry treatment machine according to an embodiment of the present disclosure, while a speed of the washing tub motor increases, when the output current flowing in the drain motor decreases in the state where the speed of the drain motor is the first speed, the controller may control the drain motor to rotate at the second speed lower than the first speed.

In the laundry treatment machine according to an embodiment of the present disclosure, when the output current flowing in the drain motor decreases in the state where the speed of the drain motor is the first speed while a water level in the washing tub is kept constant, the controller may control the drain motor to rotate at the second speed lower than the first speed.

In the laundry treatment machine according to an embodiment of the present disclosure, while the water level in the washing tub decreases, the controller may control the speed of the drain motor to be gradually increased from a third speed lower than the first speed and higher than the second speed.

In the laundry treatment machine according to an embodiment of the present disclosure, before the water level in the washing tub decreases, the controller may control the drain motor to rotate at a fourth speed lower than the third speed and higher than the second speed.

In the laundry treatment machine according to an embodiment of the present disclosure, when drainage is initiated, the controller may control the speed of the drain motor to be rapidly increased from the fourth speed to the third speed.

Another embodiment of the present disclosure provides a laundry treatment machine including: an inverter converting a direct current (DC) voltage from a converter into an alternating current (AC) voltage based on a switching operation and outputting the converted AC voltage to a drain motor; an output current detector to detect an output current flowing in the drain motor; and a controller to control the drain motor to rotate at a first speed if the wash water introduced to the vortex chamber is fully filled and rotated at a speed lower than the first speed if the wash water introduced to the vortex chamber is partially filled.

Advantageous Effects

According to an embodiment of the present disclosure, there is provided a laundry treatment machine including: an inverter converting a direct current (DC) voltage from a converter into an alternating current (AC) voltage based on a switching operation and outputting the converted AC voltage to a drain motor; an output current detector to detect an output current flowing in the drain motor; and a controller to control the drain motor to rotate at a speed lower than a first speed, when the output current flowing in the drain motor decreases in a state where a speed of the drain motor is the first speed. Accordingly, it is possible to reduce a pressure in a vortex chamber of a drain pump. In particular, drainage can be smoothly performed while reducing the pressure in the vortex chamber of the drain pump during dewatering.

In addition, noise or vibration resulting from the operation of the drain pump, which may occur when the pressure in the vortex chamber increases, can be reduced.

In the laundry treatment machine according to an embodiment of the present disclosure, when the output current flowing in the drain motor decreases, the controller may increase the speed of the drain motor when a predetermined time elapses after the drain motor is driven at a second speed lower than the first speed. Accordingly, it is possible to reduce the pressure in the vortex chamber of the drain pump during dewatering. In particular, drainage can be smoothly performed during the dewatering.

In the laundry treatment machine according to an embodiment of the present disclosure, the controller may control the speed of the drain motor to be decreased and increased repeatedly until dewatering is completed. Accordingly, it is possible to reduce the pressure in the vortex chamber of the drain pump during dewatering. In particular, drainage can be smoothly performed during the dewatering.

In the laundry treatment machine according to an embodiment of the present disclosure, when the output current flowing in the drain motor increases when the drain motor is driven at a speed lower than the first speed, the controller may control the speed of the drain motor to be increased. Accordingly, it is possible to reduce the pressure in the vortex chamber of the drain pump during dewatering. In particular, drainage can be smoothly performed during the dewatering.

In the laundry treatment machine according to an embodiment of the present disclosure, the controller may control a power of the drain motor when driven at the first speed to be the same as that of the drain motor when driven at the second speed. Accordingly, the converter merely needs to supply a constant power, thereby improving the stability of the converter. In addition, since power control is performed, a time required for completion of drainage can be shortened as compared with that when speed control is performed.

In the laundry treatment machine according to an embodiment of the present disclosure, when the output current flowing in the drain motor decreases in the state where the speed of the drain motor is the first speed while a speed of the washing tub motor increases, the controller may control the drain motor to rotate at the second speed lower than the first speed. Accordingly, it is possible to reduce the pressure in the vortex chamber of the drain pump during dewatering. In particular, drainage can be smoothly performed during the dewatering.

In the laundry treatment machine according to an embodiment of the present disclosure, when the output current flowing in the drain motor decreases in the state where the speed of the drain motor is the first speed while a water level in the washing tub is kept constant, the controller may control the drain motor to rotate at the second speed lower than the first speed. Accordingly, it is possible to reduce the pressure in the vortex chamber of the drain pump during dewatering. In particular, drainage can be smoothly performed during the dewatering.

In the laundry treatment machine according to an embodiment of the present disclosure, while the water level in the washing tub decreases, the controller may control the speed of the drain motor to be gradually increased from a third speed lower than the first speed and higher than the second speed. Accordingly, it is possible to reduce the pressure in the vortex chamber of the drain pump during dewatering. In particular, drainage can be smoothly performed during the dewatering.

In the laundry treatment machine according to an embodiment of the present disclosure, before the water level in the washing tub decreases, the controller may control the drain motor to rotate at a fourth speed lower than the third speed and higher than the second speed. Accordingly, it is possible to reduce the pressure in the vortex chamber of the drain pump during dewatering. In particular, drainage can be smoothly performed during the dewatering.

In the laundry treatment machine according to an embodiment of the present disclosure, when drainage is initiated, the controller may control the speed of the drain motor to be rapidly increased from the fourth speed to the third speed. Accordingly, it is possible to reduce the pressure in the vortex chamber of the drain pump during dewatering. In particular, drainage can be smoothly performed during the dewatering.

According to another embodiment of the present disclosure, there is provided a laundry treatment machine including: an inverter converting a direct current (DC) voltage from a converter into an alternating current (AC) voltage based on a switching operation and outputting the converted AC voltage to a drain motor; an output current detector to detect an output current flowing in the drain motor; and a controller to control the drain motor to rotate at a first speed if the wash water introduced to the vortex chamber is fully filled and rotated at a speed lower than the first speed if the wash water introduced to the vortex chamber is partially filled. Accordingly, it is possible to reduce a pressure in a vortex chamber of a drain pump. In particular, drainage can be smoothly performed while reducing the pressure in the vortex chamber of the drain pump during dewatering.

In addition, noise or vibration resulting from the operation of the drain pump, which may occur when the pressure in the vortex chamber increases, can be reduced.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
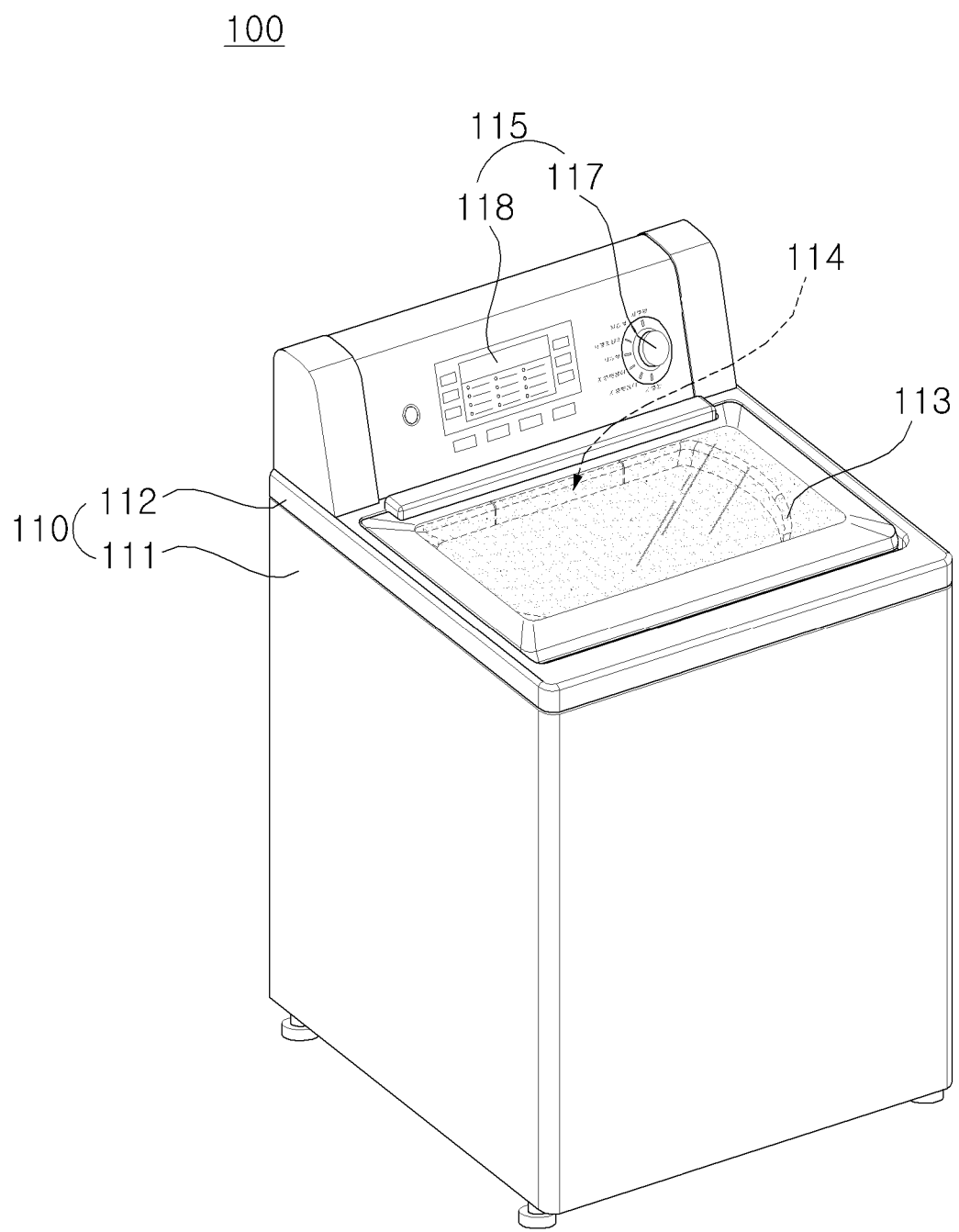
FIG. 1 is a perspective view illustrating a laundry treatment machine according to an embodiment of the present disclosure.
Figure 2:
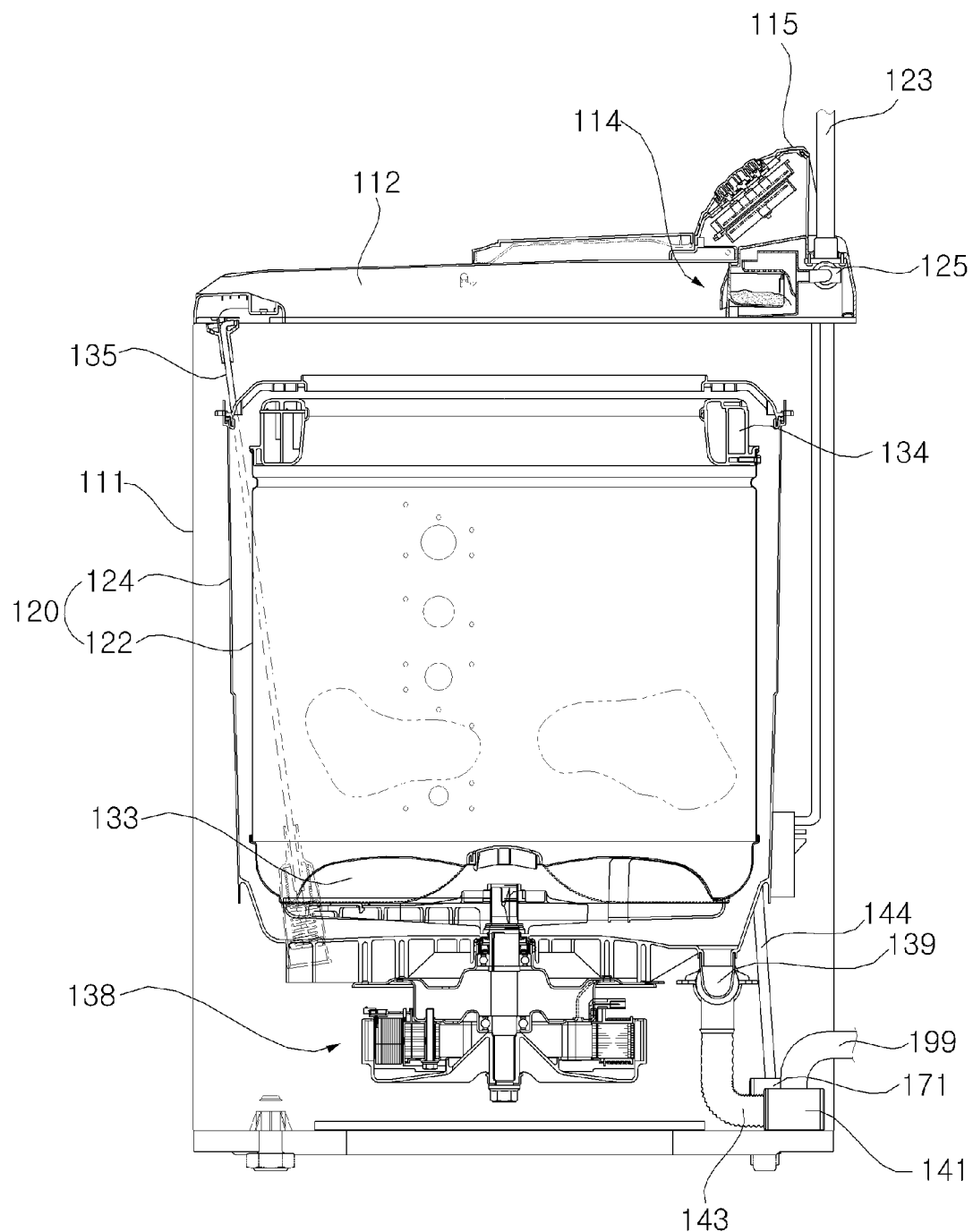
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
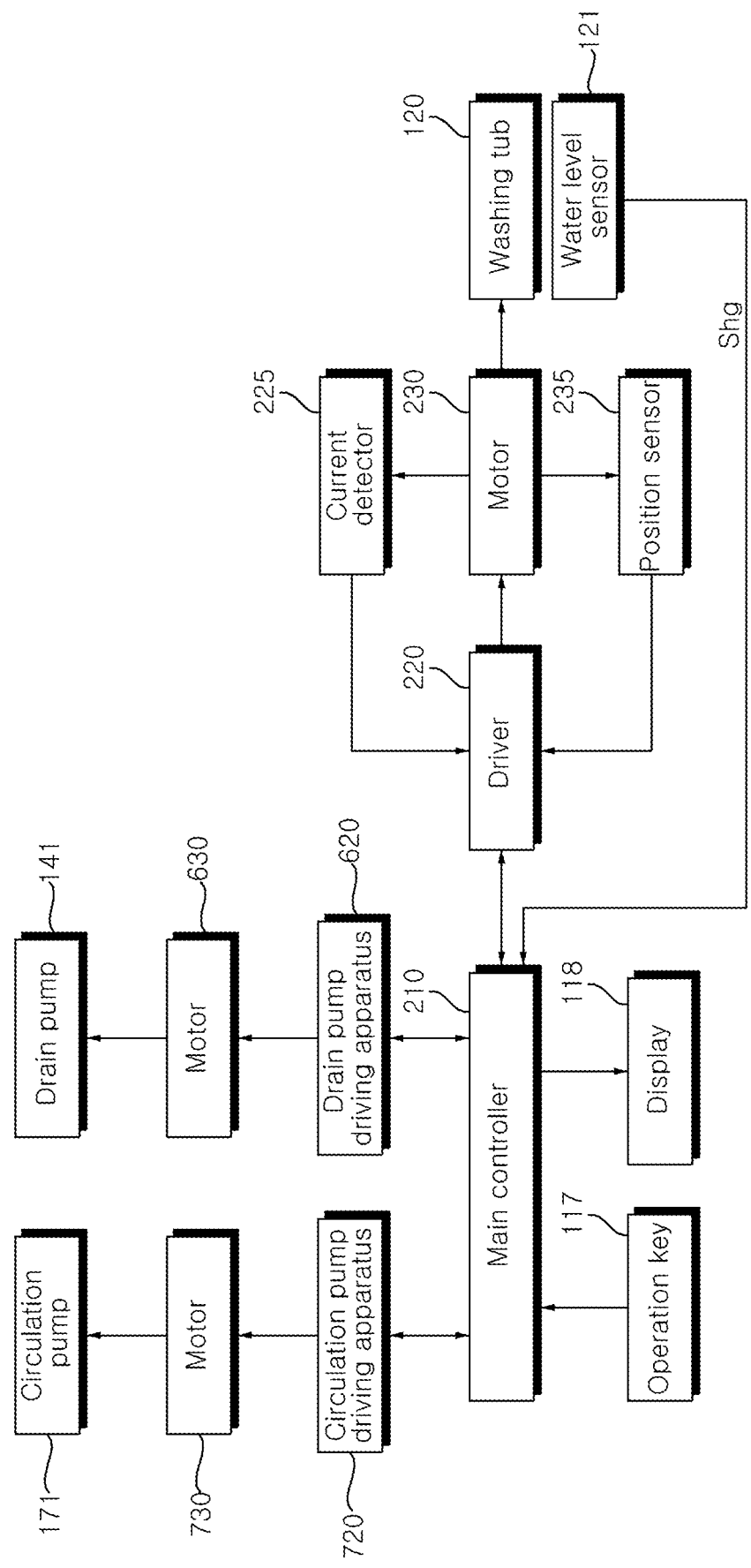
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a drain pump 141 for pumping the wash water may be provided.

Moreover, a circulation pump 171 for pumping wash water may be provided on an end of the drain channel 143.

The wash water pumped by the circulation pump 171 may be introduced into a washing tub 120 through a circulation channel 144.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry in the inner tub 122, the rotational speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driver 220 is controlled by the main controller 210, and the driver 220 drives the motor 230. Thereby, the washing tub 120 is rotated by the motor 230.

Meanwhile, the laundry treatment machine 100 may include a motor 630 for driving the drain pump 141 and a drain pump driving apparatus 620 for driving the motor 630. The drain pump driving apparatus 620 may be controlled by the main controller 210.

Meanwhile, the laundry treatment machine 100 may include a motor 730 for driving the circulation pump 171 and a circulation pump driving apparatus 720 for driving the motor 730. The circulation pump driving apparatus 720 may be controlled by the main controller 210.

In this specification, the drain pump driving apparatus 620 may be referred to as a drain pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the motor 230. For example, the main controller 210 may control the driver 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the motor 230, may include an inverter (not shown) and an inverter controller (not shown). In addition, the driver 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
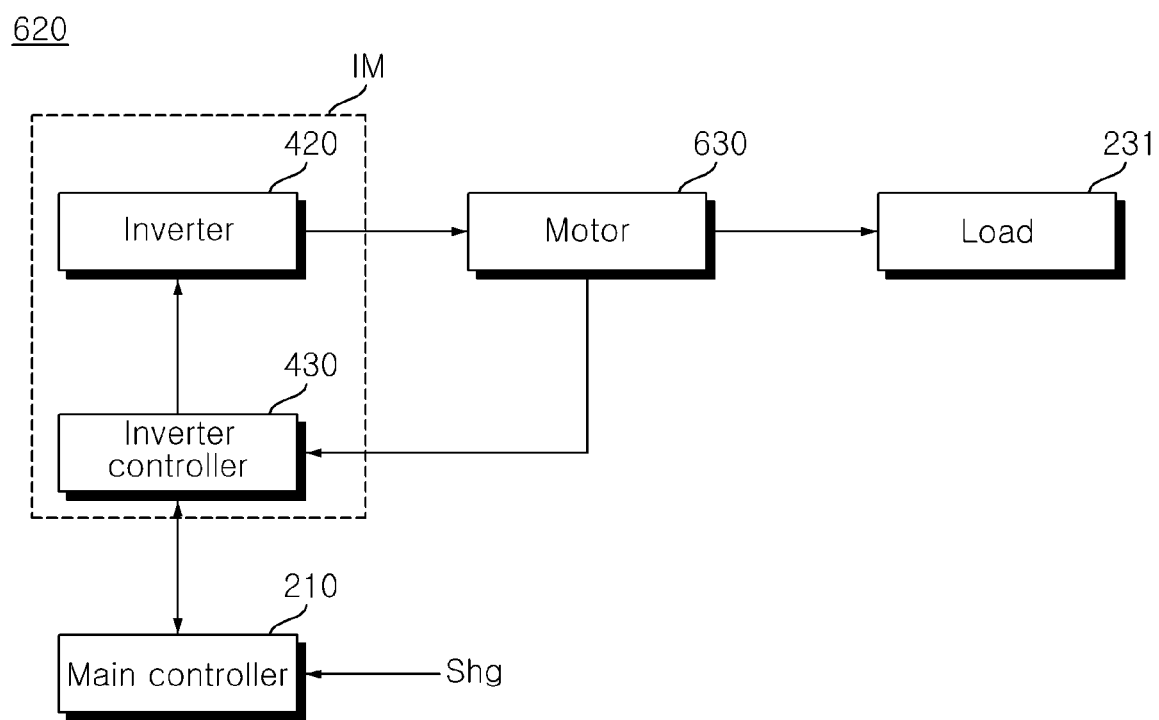
FIG. 4 illustrates an example of an internal block diagram of a drain pump driving apparatus of FIG. 1.
Figure 5:
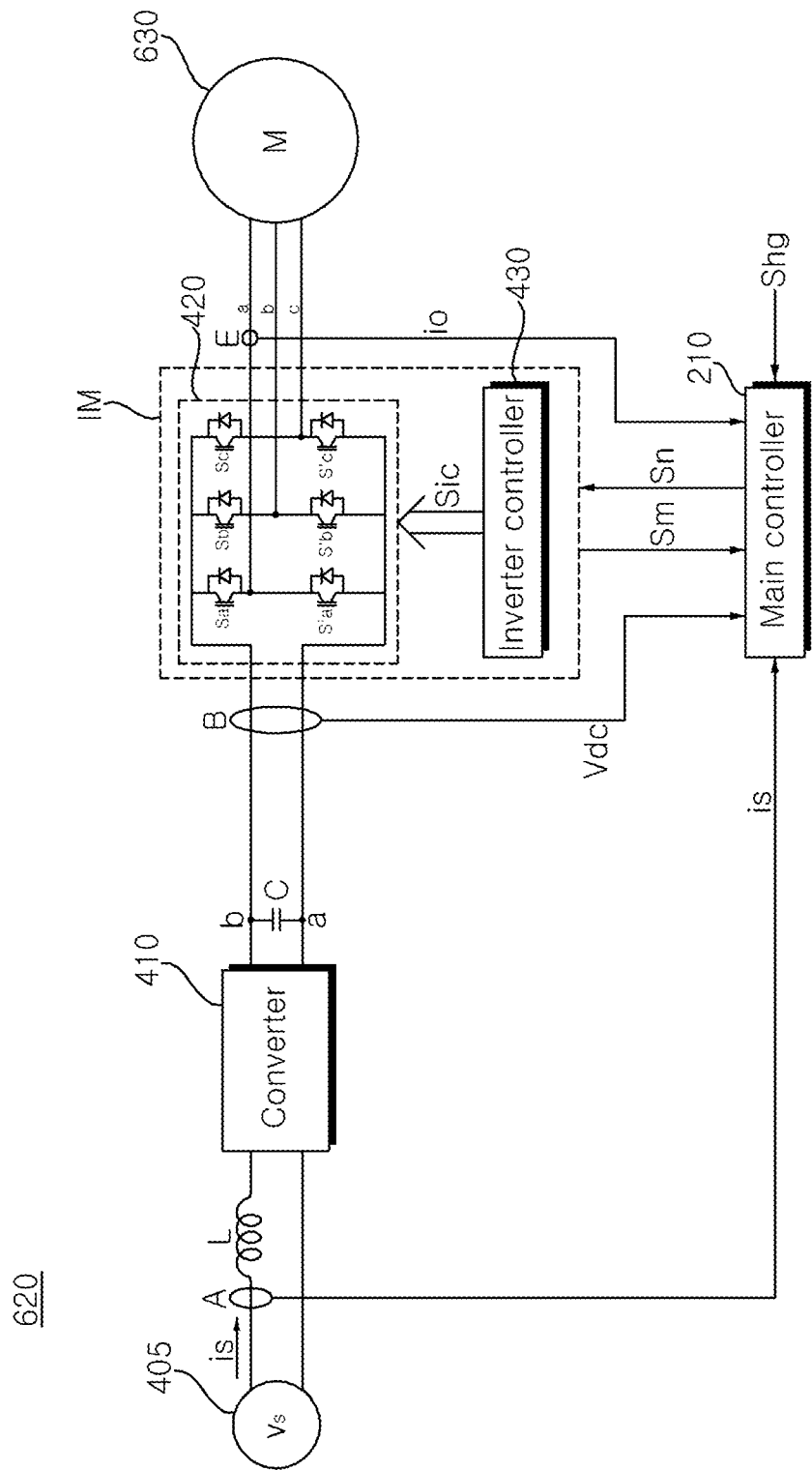
FIG. 5 illustrates an example of an internal circuit diagram of the drain pump driving apparatus of FIG. 4.

FIG. 4 illustrates an example of an internal block diagram of the drain pump driving apparatus of FIG. 1, and FIG. 5 illustrates an example of an internal circuit diagram of the drain pump driving apparatus of FIG. 4.

Referring to FIGS. 4 and 5, the drain pump driving apparatus 620 according to an embodiment of the present disclosure serves to drive the motor 630 in a sensorless manner, and may include an inverter 420, an inverter controller 430, and a main controller 210.

The main controller 210 and the inverter controller 430 may correspond to a controller and a second controller described in this specification, respectively.

The drain pump driving apparatus 620 according to an embodiment of the present disclosure may include a converter 410, a DC terminal voltage detector B, a DC terminal capacitor C, and an output current detector E. In addition, the drain pump driving apparatus 620 may further include an input current detector A and a reactor L.

Hereinafter, an operation of each constituent unit in the drain pump driving apparatus 620 of FIGS. 4 and 5 will be described.

The reactor L is disposed between a commercial AC voltage source 405 (vs) and the converter 410, and performs a power factor correction operation or a boost operation. In addition, the reactor L may also function to limit a harmonic current resulting from high-speed switching of the converter 410.

The input current detector A may detect an input current is is input from the commercial AC voltage source 405. To this end, a current transformer (CT), a shunt resistor, or the like may be used as the input current detector A. The detected input current is is may be input to the inverter controller 430 or the main controller 210 as a discrete signal in the form of a pulse. In FIG. 5, it is illustrated that the detected input current is is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies depending on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed voltage. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous drain motor 630.

For example, when the synchronous drain motor 630 is in a 3-phase type, the inverter 420 may convert the DC voltage Vdc into 3-phase AC voltages va, vb and vc and output the 3-phase AC voltages to the three-phase synchronous drain motor 630 as shown in FIG. 5.

As another example, when the synchronous drain motor 630 is in a single-phase type, the inverter 420 may convert the DC voltage Vdc into a single-phase AC voltage and output the single-phase AC voltage to a single-phase synchronous drain motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous drain motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current io detected by the output current detector E and a DC terminal voltage Vdc detected by the DC terminal voltage detector B.

The main controller 210 may calculate a power based on the output current io and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current io flowing in the 3-phase motor 630.

The output current E may be disposed between the 3-phase drain motor 630 and the inverter 420 to detect an output current io flowing in the motor. In the drawing, it is illustrated that the a-phase current is detected, out of the phase current ia, ib, and ic which is the output current io flowing in the drain motor 630.

Meanwhile, as opposed to the drawing, the output current detector E may be disposed between the DC terminal capacitor C and the inverter 420 and sequentially detect the output current flowing in the motor. In this case, one shunt resistance element Rs may be used, and the phase current ia, ib, and ic flowing in the drain motor 630 may be detected in a time-division manner.

The detected output current io may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC voltage at a predetermined frequency for each phase is applied to a coil of the stator for each phase (phase a, b or c).

Such a motor 630 may include a brushless DC (BLDC) motor.

The motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
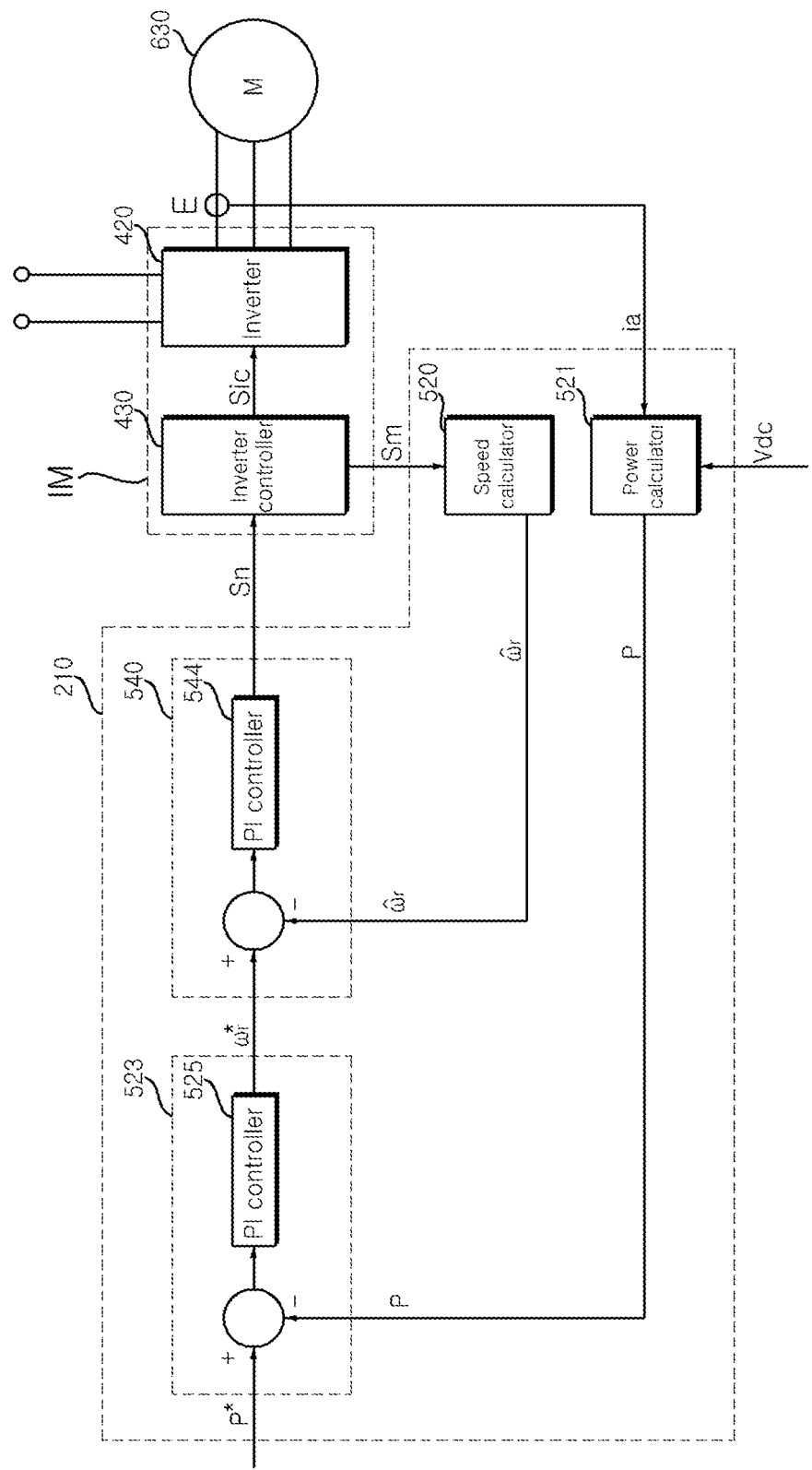
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the motor 630 received from the inverter controller 430.

Specifically, the speed calculator 520 may calculate a zero crossing for the voltage information Sm of the motor 630 received from the inverter controller 430, and calculate a speed of the drain motor 630 based on the zero crossing.

The power calculator 521 may calculate a power P supplied to the motor 630, based on the output current idc detected by the output current detector E and the DC terminal voltage Vdc detected by the DC terminal voltage detector B.

The power controller 523 may generate a speed command value ω*r based on the power P calculated by the power calculator 521 and a preset power command value P*r.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, during drainage, the main controller 210 according to the embodiment of the present disclosure may control the power supplied to the drain motor 630 to be constant without decreasing over time. Accordingly, the drainage time may be reduced.

Meanwhile, the main controller 210 according to the embodiment of the present disclosure may perform power control on the drain motor 630 at the start of drainage, and, when the remainder of the water is reached, may finish the power control. Accordingly, drainage operation may be performed efficiently.

The main controller 210 according to an embodiment of the present disclosure may control the voltage command value Sn and a duty of the switching control signal Sic to be greater as the output current io is at a smaller level. Accordingly, the motor 630 can be driven with a constant power.

The drain motor 630 according to an embodiment of the present disclosure may be implemented as a brushless DC drain motor 630. Accordingly, the power control, rather than constant-speed control, can be implemented in a simple manner.

Meanwhile, the main controller 210 according to another embodiment of the present disclosure may be configured to increase the speed of the drain motor 630 during the drainage if the power supplied to the motor 630 does not reach the first power and to decrease the speed of the drain motor 630 if the power supplied to the motor 630 exceeds the first power.

Meanwhile, the main controller 210 according to the embodiment of the present disclosure may control the speed of the motor 630 to be constant, if the power supplied to the motor 630 reaches the first power.

Since the power control allows for driving at constant power as described above, the converter 410 supplies constant power, thereby improving the stability of the converter 410. Also, the power control allows for minimizing a decrease in drainage performance according to installation conditions.

Moreover, the drain motor 630 may be driven stably, and, therefore, the drainage time may be reduced.

Figure 7:
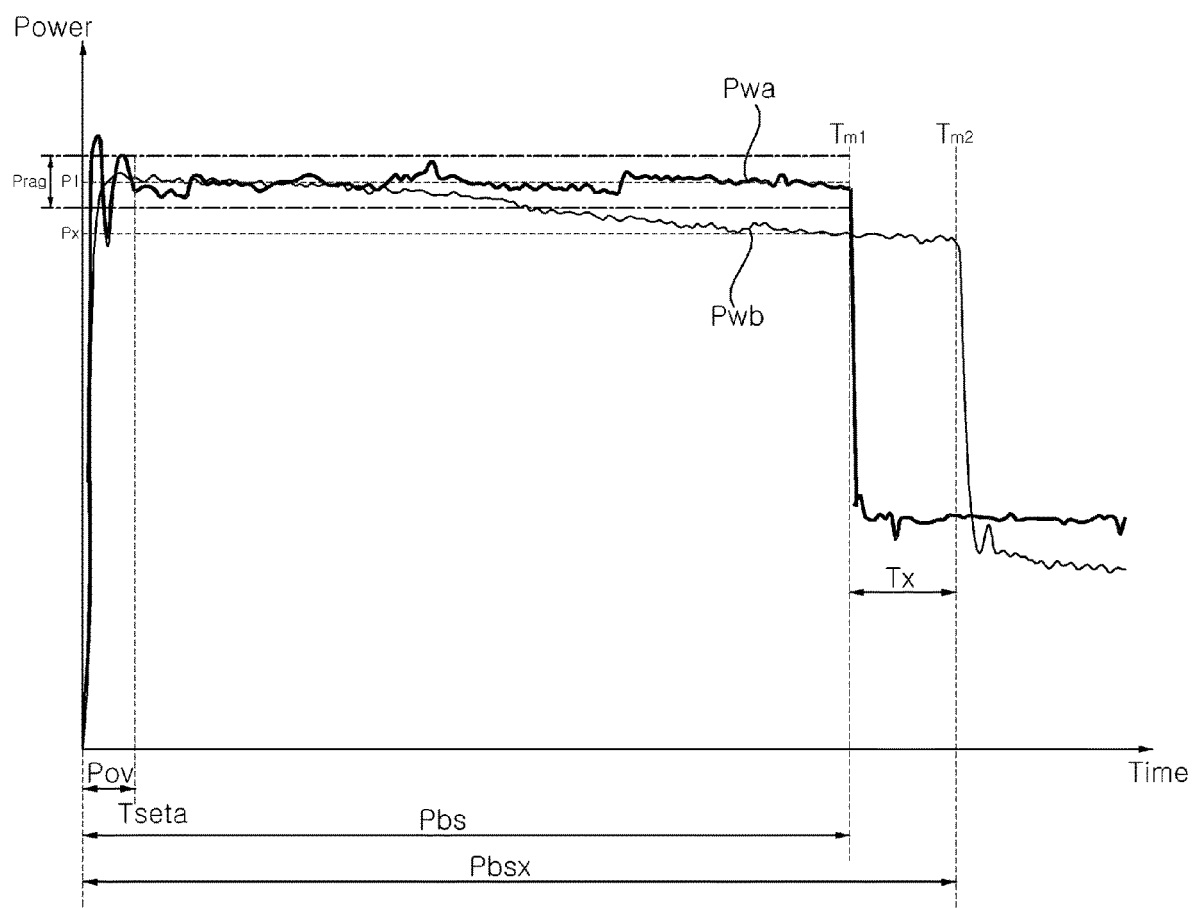
FIG. 7 is a view showing power supplied to a motor according to power control and speed control.

FIG. 7 is a view showing power supplied to a motor according to power control and speed control.

When the power control is performed as in the embodiments of the present disclosure, a time-dependent waveform of the power supplied to the motor 630 may be exemplified as Pwa.

FIG. 7 illustrates that the power is maintained in a substantially constant manner until time point Tm1 by performing the power control, and the power control is terminated at time point Tm1.

By performing the power control, the main controller 210 may control the power supplied to the motor 630, during the drainage, to be constant without decreasing over time, although the water level in the washing tub 120 decreases.

By performing the power control, the main controller 210 may control the power supplied to the motor 630, during the drainage, to be the first power P1.

In particular, even if the lift is changed, the main controller 210 may control the power supplied to the motor 630, during the drainage, to be the constant first power P1, by performing the power control.

At this time, the constant first power P1 may mean that the motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the motor 630 is driven with a power within the first allowable range Prag based on the first power P1 from time point Tseta until time point Tm1 when the drainage is completed, excluding an overshooting period Pov. Accordingly, water pumping can be performed smoothly even if the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a reference level Iref, the main controller 210 may control the motor 630 to be driven with a power within the first allowable range Prag based on the first power P1, without decreasing over time, from first time point Tseta after the drainage is started until time point Tm1 when the drainage is completed, and when the lift is at a second level, the main controller 210 may control the motor 630 to be driven with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current io and the DC terminal voltage Vdc and output a voltage command value Sn based on the calculated power, and the inverter controller 430 may output a switching control signal Sic to the motor 630 based on the voltage command value Sn.

Meanwhile, the main controller 210 may control the voltage command value Sn and a duty of the switching control signal Sic to be greater as the output current io is at a smaller level. Accordingly, the motor 630 can be driven with a constant power.

Meanwhile, the main controller 210 may control the power supplied to the drain motor 630 to increase abruptly during a period PoV to perform power control.

Meanwhile, the main controller 210 may control the power supplied to the drain motor 630 to decrease abruptly from the time point Tm1.

Unlike the embodiments of the present disclosure, when the speed control is performed, that is, when the speed of the drain motor 630 is controlled to be maintained constantly, a time-dependent waveform of the power supplied to the motor 630 may be exemplified as Pwb.

In the drawing, it is illustrated that the speed control is performed until time point Tm2, and the speed control is terminated at time point Tm2.

The waveform Pwb of the power based on the speed control indicates that the power supplied to the motor 630 may be gradually reduced, while the speed of the motor 630 is constant, as the water level in the washing tub decreases during the drainage.

In FIG. 7, it is illustrated that, during a speed control period Pbsx, the power supplied to the motor 630 is gradually reduced up to approximately Px at time point Tm2 when the drainage is completed.

Accordingly, the time when the operation of the motor 630 is terminated in a case where the speed control is performed is Tm2, which is delayed by approximately period Tx, when compared to that in a case where the power control is performed.

Consequently, according to the embodiments of the present disclosure, since the power control is performed during the drainage, the drainage time can be shortened by approximately period Tx, when compared to that in the case where the speed control is performed. In addition, the power supplied from the converter 410 can be kept constant, thereby improving the operation stability of the converter 410.

Figure 8:
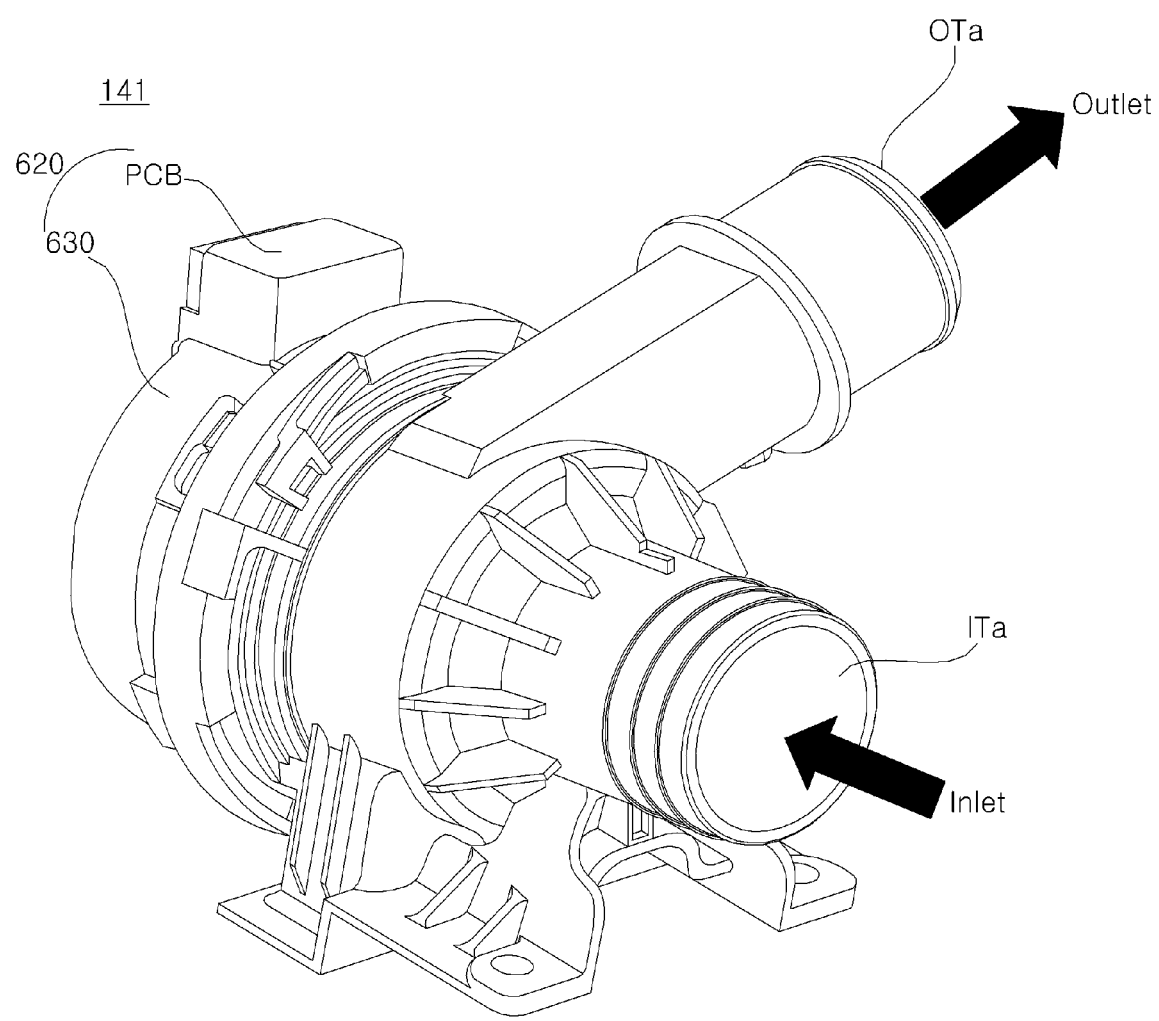
FIGS. 8 and 9 are views illustrating the outer appearance of a drain pump driving apparatus according to an embodiment of the present disclosure.
Figure 9:
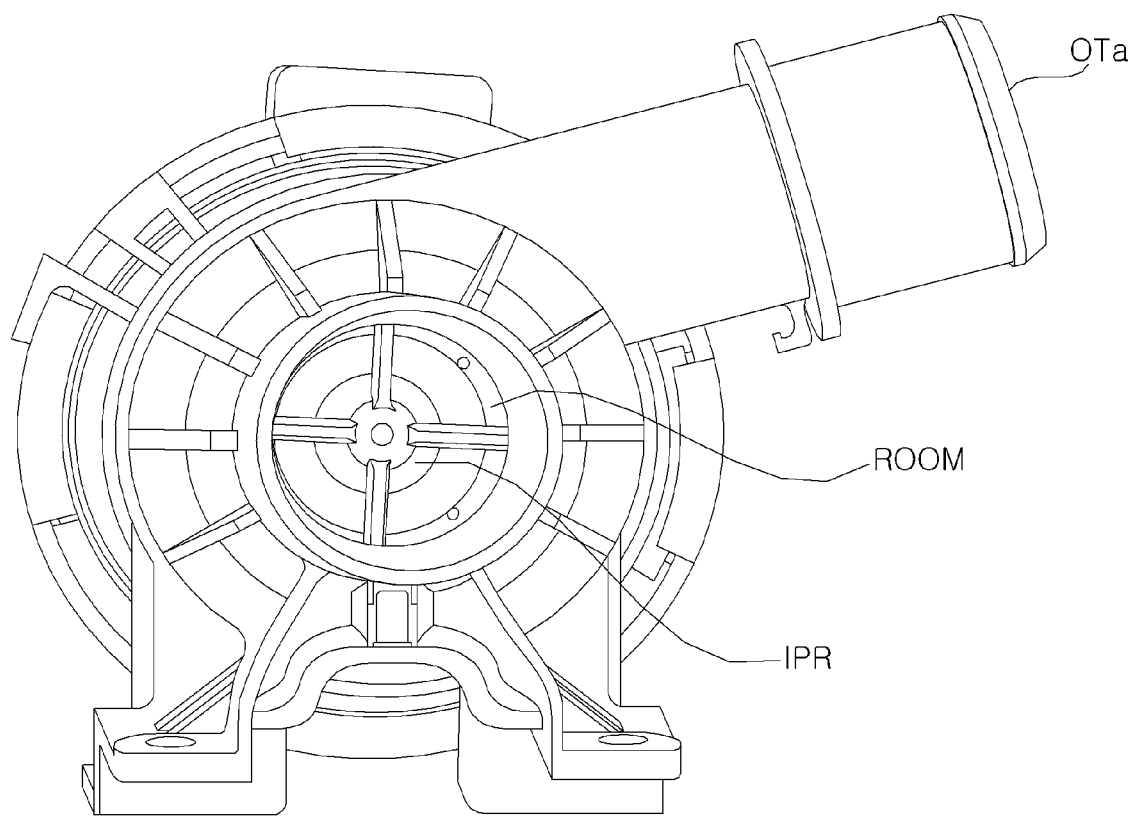

FIGS. 8 and 9 are views illustrating the outer appearance of a drain pump driving apparatus according to an embodiment of the present disclosure.

Referring to FIGS. 8 and 9, wash water is drained through the drain channel 143 connected to the outer tub 124, and the drain channel 143 is connected to a water introduction part ITa of the drain pump 141.

The water introduction part ITa is formed of a hollow tube, and a vortex chamber ROOM with a larger diameter than that of the water introduction part ITa is formed within the water introduction part ITa.

An impeller IPR which rotates by the torque of the drain motor 630 is disposed in the vortex chamber ROOM.

Meanwhile, the drain motor 630 and a circuit board PCB for applying an electrical signal to the drain motor 630 may be disposed on the opposite side of the water introduction part ITa relative to the impeller IPR. The above-described drain pump driving apparatus 220 may be mounted on the circuit board PCB.

Meanwhile, a water discharge part OTa for discharging water may be disposed on one side of the vortex chamber ROOM, in a direction intersecting the water introduction part ITa. In this case, the water discharge part OTa may be connected to a drain pipe 199.

Particularly, the water discharge part OTa may be formed in a direction normal to the vortex chamber ROOM, for smooth drainage. Such a structure of the drain pump 141 may be called a volute-type drain pump structure.

In the case of such a volute-type drain pump structure, the water discharge part OTa is formed on one side of the vortex chamber ROOM. Thus, it is desirable that the drain motor 730 rotates counterclockwise CCW relative to FIG. 9.

Meanwhile, as described above, since the drain pipe 199 is positioned higher than the drain pump 141, the water discharge part OTa may be sloped in the direction of the drain pipe 199.

Similarly, the water introduction part ITa also may be sloped, and the angle of slope of the water introduction part ITa to the ground may be smaller than the angle of slope of the water discharge part OTa to the ground. Therefore, water is introduced more smoothly into the water introduction part ITa, and the water in the vortex chamber ROOM is discharged through the water discharge part OTa by means or the impeller IPR which rotates by the torque of the drain motor 630.

Figure 10A:
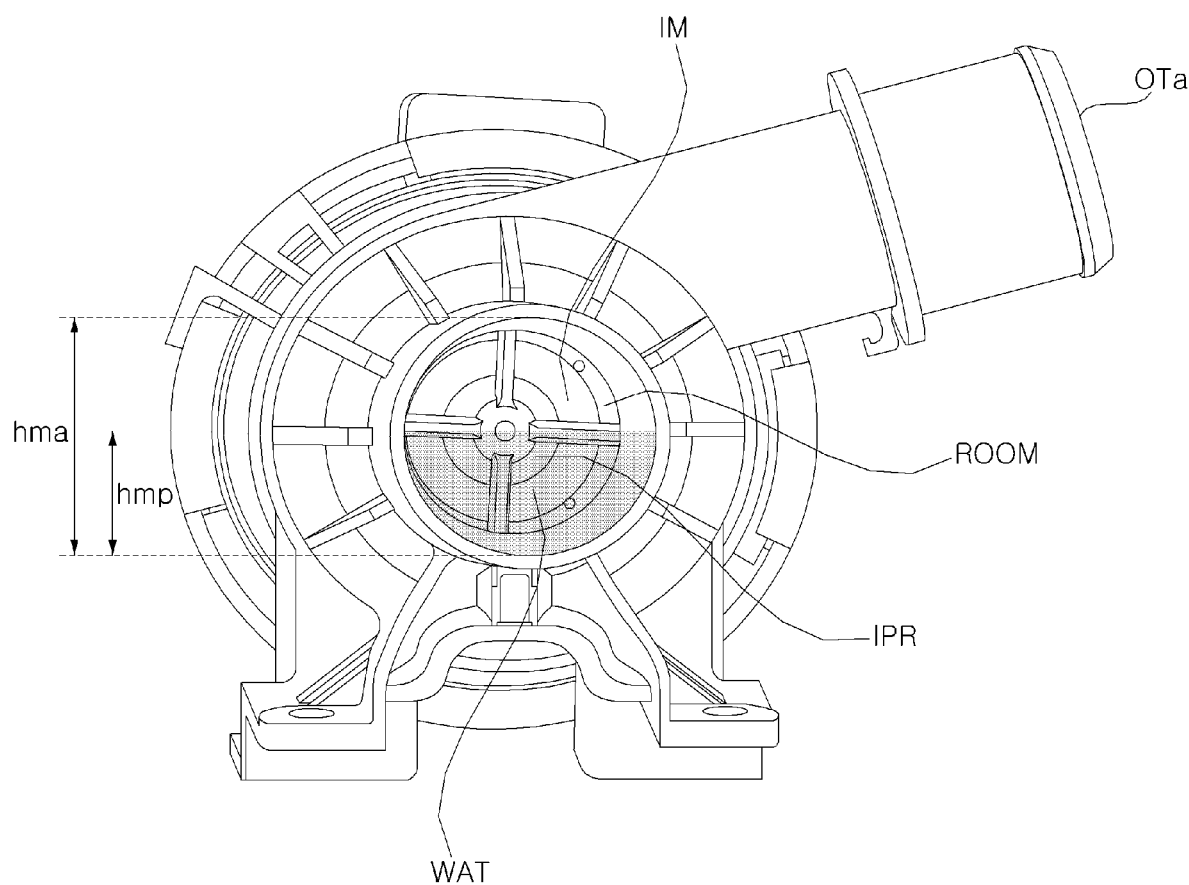
FIGS. 10A and 10B are views illustrating an amount of wash water introduced into a vortex chamber of a drain pump.
Figure 10B:
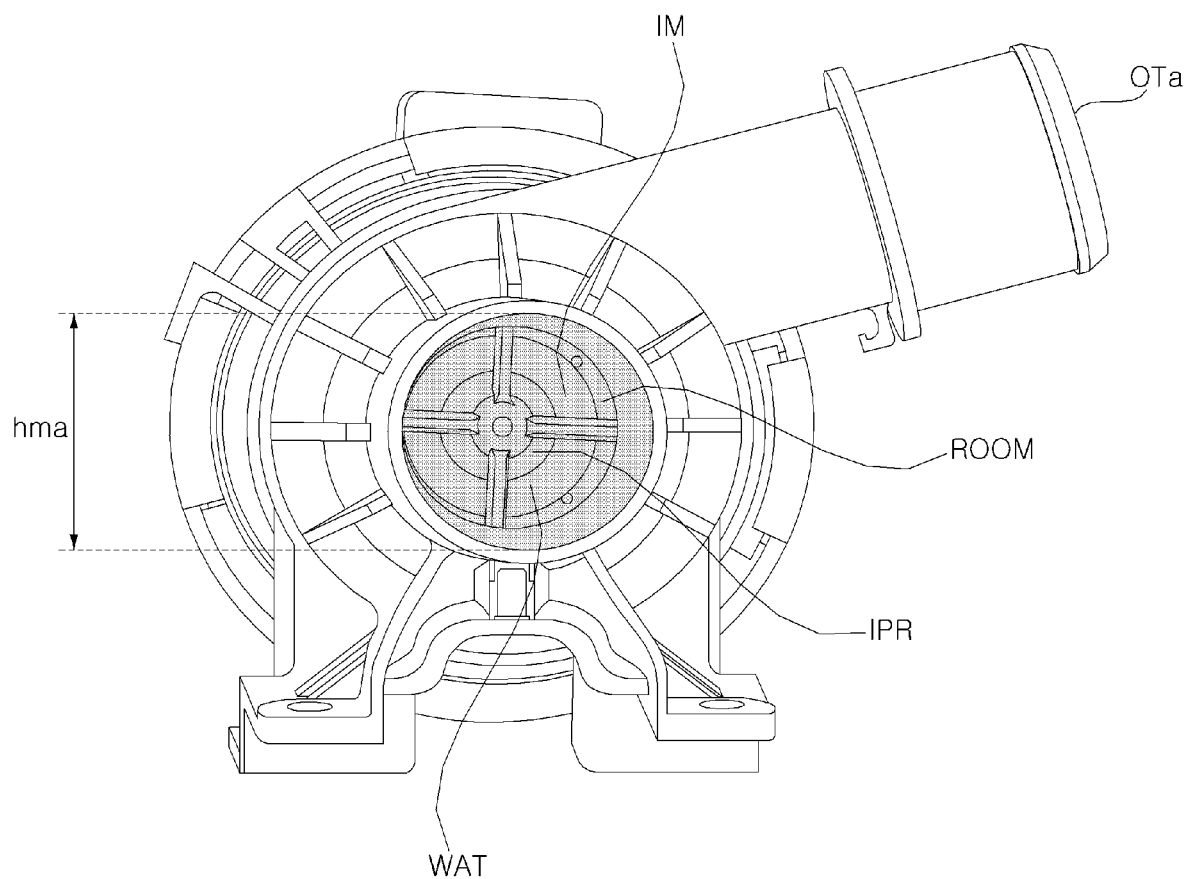

FIGS. 10A and 10B are views illustrating an amount of wash water introduced into the vortex chamber of the drain pump.

FIG. 10A illustrates that the vortex chamber ROOM is partially filled with the wash water WAT introduced thereinto, and FIG. 10B illustrates that the vortex chamber ROOM is fully filled with the wash water WAT introduced thereinto, that is, the vortex chamber ROOM is full of the wash water WAT.

As shown in FIG. 10B, when the vortex chamber ROOM is fully filled with the wash water WAT introduced thereinto, a pressure inside the vortex chamber ROOM does not increase significantly, and the impeller IPR rotate clockwise CW by a torque of the drain motor 630, so that drainage can be smoothly performed through the water discharge part OTa.

However, as shown in FIG. 10A, when the vortex chamber ROOM is partially filled with the wash water WAT introduced thereinto, a pressure inside the vortex chamber ROOM increases significantly, and accordingly, a rotational speed of the drain motor 630 increases to a first speed, which is a limit speed, and a level of an output current io flowing in the drain motor 630 decreases to a reference level Iref or less.

Due to the increase in pressure inside the vortex chamber ROOM, drainage is not smoothly performed even though the drain motor 630 is operated. In addition, since the wash water WAT is present partially in the vortex chamber ROOM, noise and vibration are generated, during the operation of the drain motor 630, due to the air present in the vortex chamber ROOM.

Thus, the present disclosure proposes a method of reducing an increase in pressure inside the vortex chamber ROOM and a method of reducing noise and vibration during the operation of the drain pump. This will be described with reference to FIG. 11 and the subsequent drawings.

Figure 11:
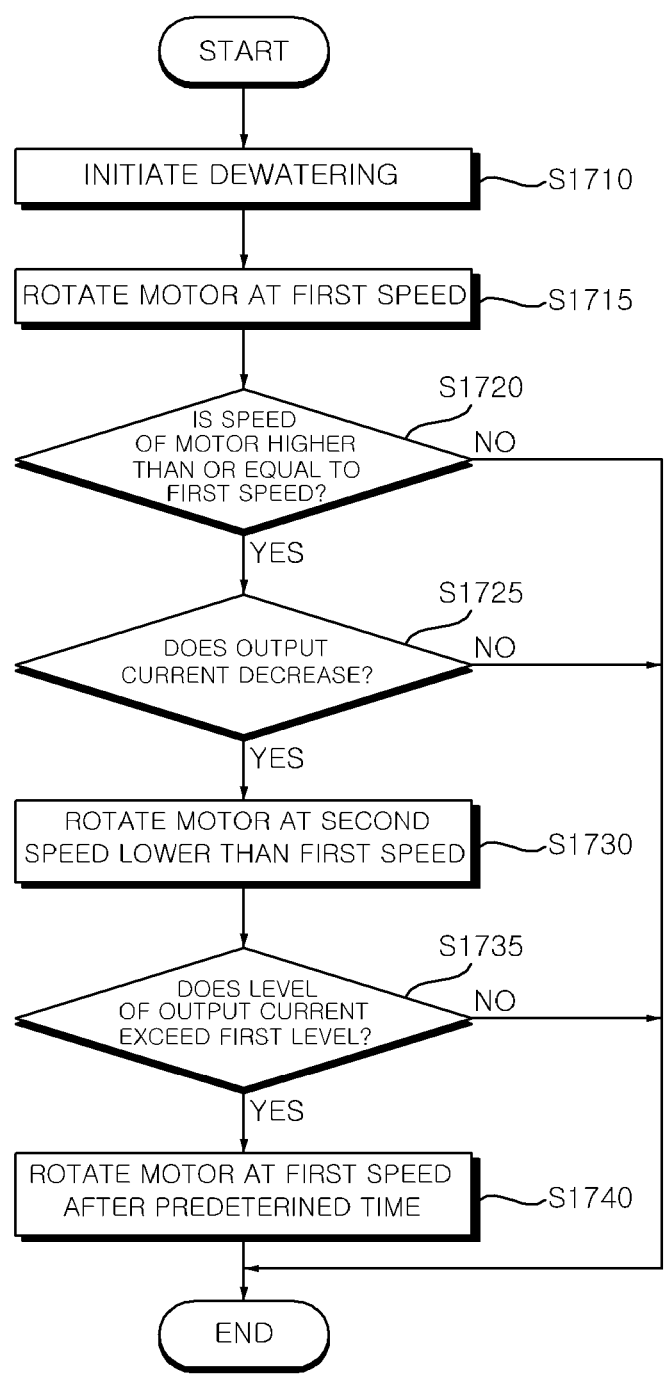
FIG. 11 is a flowchart illustrating an operation method of a laundry treatment machine according to an embodiment of the present disclosure.
Figure 12A:
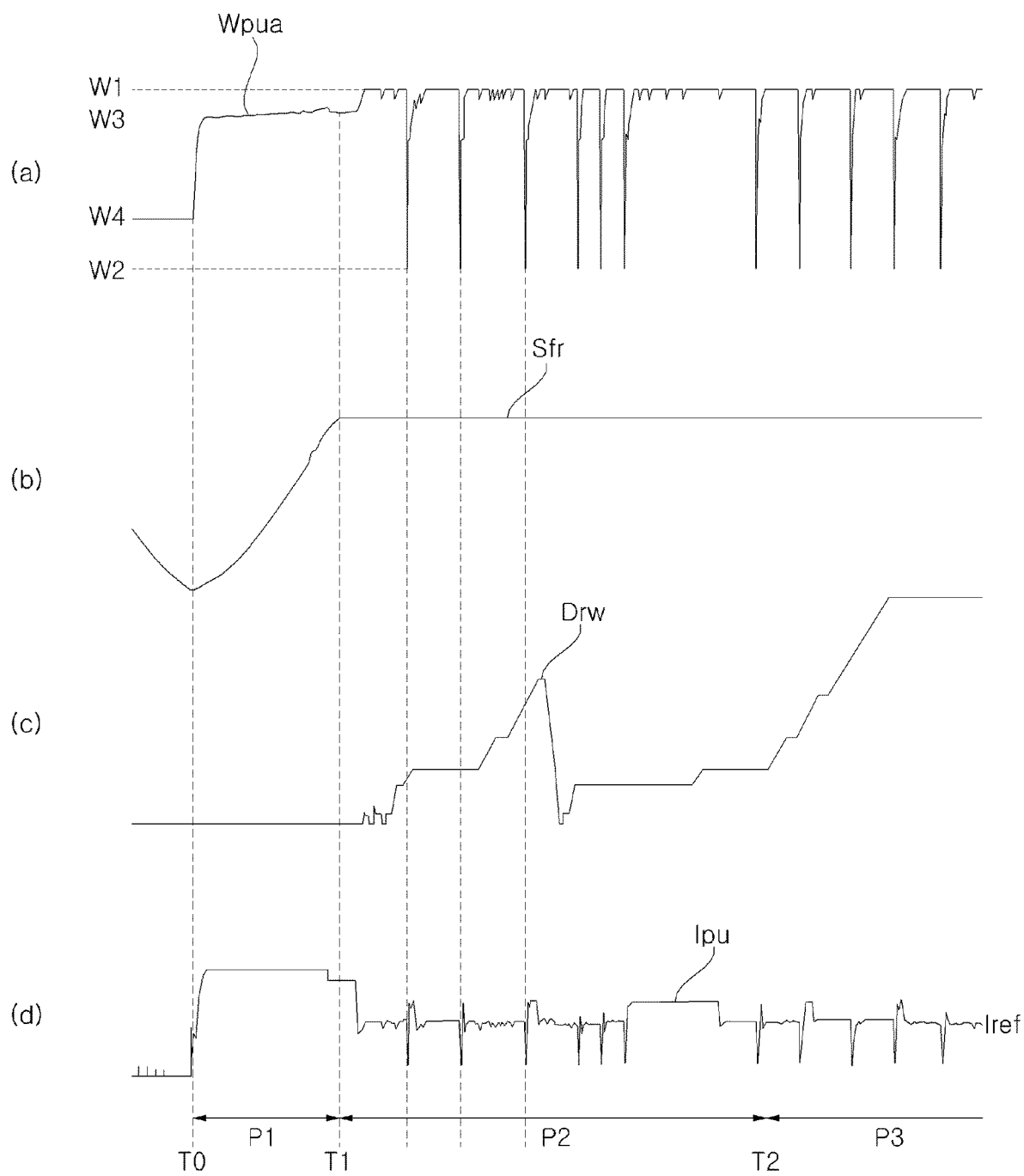
FIGS. 12A and 12B are views referred to for explaining the operation method of FIG. 11.
Figure 12B:
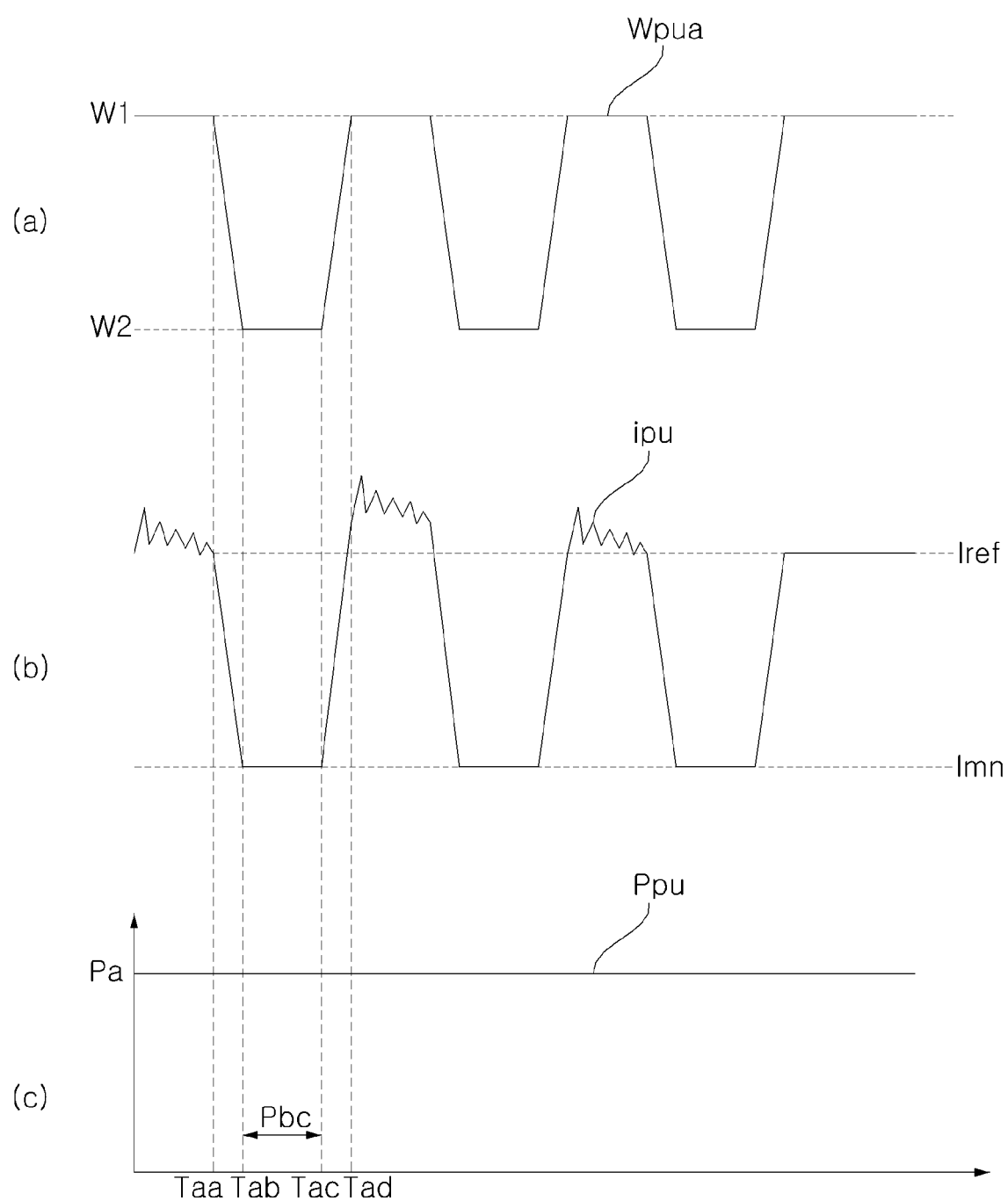

FIG. 11 is a flowchart illustrating an operation method of a laundry treatment machine according to an embodiment of the present disclosure, and FIGS. 12A and 12B are views referred to for explaining the operation method of FIG. 11.

Referring to FIG. 11, the main controller 210 initiates dewatering (S1710).

Here, the dewatering may be performed in each of washing, rinsing and dewatering processes. For example, the dewatering may be performed during the washing process, during the rinsing process, and during the dewatering process.

While performing the dewatering, drainage may be performed, and accordingly, the main controller 210 may control the drain motor 630 to operate (S1715).

Next, in order to reduce the increase in pressure inside the vortex chamber ROOM, the main controller 210 determines whether the speed of the drain motor 630 is higher than or equal to the first speed (S1720), and if so, the main controller 210 determines whether the level of the output current io flowing in the drain motor 630 decreases (S1725).

For example, the main controller 210 determines whether the level of the output current io flowing in the drain motor 630 is lower than or equal to the reference level Iref, and if so, the main controller 210 determines that the pressure inside the vortex chamber ROOM increases.

That is, when the speed of the drain motor 630 increases to reach or exceed the first speed W1, which is the limit speed, and the level of the output current io is lower than or equal to the reference level Iref, the main controller 210 may determine that the vortex chamber ROOM is partially filled with the wash water introduced thereinto as shown in FIG. 10A and thus determine that the pressure inside the vortex chamber ROOM increases.

In this case, the main controller 210 may control the drain motor 630 to be driven at a second speed W2 lower than the first speed W1 (S1730).

Accordingly, it is possible to reduce the pressure in the vortex chamber ROOM of the drain pump during dewatering. In addition, noise or vibration resulting from the operation of the drain pump, which may occur when the pressure in the vortex chamber ROOM increases, can be reduced.

Meanwhile, the main controller 210 may determine whether the level of the output current io flowing in the drain motor 630 after being driven at the second speed W2 exceeds the reference level Iref (S1735), and if so, the main controller 210 may control the speed of the drain motor 630 to be increased again after a predetermined time (S1740).

When the level of the output current io flowing in the drain motor 630 after being driven at the second speed W2 exceeds the reference level Iref, a level of the wash water entering the vortex chamber ROOM gradually increases. Particularly, after the predetermined time, the level of the wash water entering the vortex chamber ROOM may be a full water level, as shown in FIG. 10B.

In this case, the main controller 210 may control the speed of the drain motor 630 to be increased again. Accordingly, drainage can be smoothly performed, and noise or vibration resulting from the operation of the drain pump can be reduced.

Particularly, when the drain motor 630 is driven at a speed lower than the first speed W1, when the output current flowing in the drain motor 630 increases, the main controller 210 may control the speed of the drain motor 630 to be increased. Accordingly, the drainage can be smoothly performed, and noise or vibration resulting from the operation of the drain pump can be reduced.

Unlike step 1735 (S1735), the main controller 210 may control the speed of the drain motor 630 to be increased when a predetermined time elapses after driving the drain motor 630 at the second speed W2. Accordingly, the drainage can be smoothly performed while reducing the pressure in the vortex chamber ROOM of the drain pump during the dewatering.

Meanwhile, the main controller 210 may control the speed of the drain motor 630 to be decreased and increased repeatedly until the dewatering is completed.

That is, during the dewatering, the main controller 210 may control the drain motor 630 to be driven such that the speed thereof is decreased from the first speed W1 to the second speed W2 and then increased from the second speed W2 to the first speed W1. Accordingly, the drainage can be smoothly performed while reducing the pressure in the vortex chamber ROOM of the drain pump during the dewatering.

Meanwhile, when the drain motor 630 is driven at the second speed W2, if the output current flowing in the drain motor 630 exceeds the reference level Iref, the main controller 210 may control the speed of the drain motor 630 to be increased after the predetermined time. Accordingly, the drainage can be smoothly performed while reducing the pressure in the vortex chamber ROOM of the drain pump during the dewatering.

Meanwhile, when the output current flowing in the drain motor 630 decreases in a state where the speed of the drain motor 630 is the first speed W1 while a speed of the washing tub motor 230 supplying a torque to the washing tub 120 increases during dewatering, the main controller 210 may control the drain motor 630 to rotate at the second speed W2 lower than the first speed W1. Accordingly, the drainage can be smoothly performed while reducing the pressure in the vortex chamber ROOM of the drain pump during the dewatering.

Meanwhile, the main controller 210 may control the drain motor 630, during dewatering, to rotate at a target speed (e.g. the first speed) when the vortex chamber is fully filled with the wash water introduced thereinto and to rotate at a speed lower than the target speed (e.g. the first speed) when the vortex chamber is partially filled with the wash water introduced thereinto. Accordingly, the drainage can be smoothly performed while reducing the pressure in the vortex chamber ROOM of the drain pump during the dewatering.

Meanwhile, the main controller 210 may control the speed of the drain motor 630 to be increased when a predetermined time elapses after driving the drain motor 630 at the speed lower than the target speed.

Meanwhile, the main controller 210 may control the speed of the drain motor 630 to be decreased and increased repeatedly until the dewatering is completed.

(a) of FIG. 12A illustrates a speed waveform Wpua of the drain motor 630, (b) of FIG. 12A illustrates a water level frequency Sfr of the washing tub 120, (c) of FIG. 12A illustrates a speed waveform Drw of the washing tub motor 230, and (d) of FIG. 12A illustrates an output current waveform Ipu of the output current flowing in the drain motor 630.

Drainage is not performed before time point TO. During a period before the time point TO at which the water level in the washing tub 120 decreases, the main controller 210 may control the drain motor 630 to rotate at a fourth speed W4 lower than a third speed W3 and higher than the second speed W2.

Particularly, while the water level in the washing tub 120 increases before the drainage period, the main controller 210 may control the drain motor 630 to rotate at the fourth speed W4 lower than the third speed W3 and higher than the second speed W2.

Then, drainage may be performed from the time point TO. Particularly, during period P1, the drainage is performed, and the water level frequency Sfr in the washing tub 120 increases and the water level in the washing tub 120 decreases.

Meanwhile, after time point T1, during period P2, dewatering is initiated. Accordingly, the speed of the washing tub motor 230 increases as indicated by the speed waveform Wpua shown in (c) of FIG. 12A.

Meanwhile, during periods P2 and P3, the main controller 210 may control the drain motor 630 to be driven at the first speed W1, which is the target speed.

Particularly, when the vortex chamber ROOM is fully filled with the wash water introduced thereinto as shown in FIG. 10B during the periods P2 and P3, the main controller 210 may control the drain motor 630 to rotate at the first speed W1, which is the target speed.

On the other hand, when the vortex chamber ROOM is partially filled with the wash water introduced thereinto as shown in FIG. 10A during the periods P2 and P3, the main controller 210 may control the drain motor 630 to rotate at a speed lower than the first speed W1, which is the target speed. The speed at this time may be the second speed W2, as shown in FIG. 12A.

When the vortex chamber ROOM is partially filled with the wash water introduced thereinto as shown in FIG. 10A, a level of the output current flowing in the drain motor 630 may be lower than or equal to the reference level Iref, as described above (d) of FIG. 12A illustrates that the drain motor 630 is driven at the second speed W2 when the level of the output current waveform Ipu of the output current flowing in the drain motor 630 is lower than or equal to the reference level Iref.

Meanwhile, the main controller 210 may control the drain motor 630 to rotate at a speed higher than the second speed W2 when a predetermined time elapses after driving the drain motor 630 at the second speed W2.

Also, the main controller 210 may control the speed of the drain motor 630 to be decreased and increased repeatedly until the periods P2 and P3, which are dewatering periods, end.

Meanwhile, when the output current flowing in the drain motor 630 decreases in a state where the speed of the drain motor 630 is the first speed W1 while the speed of the washing tub motor 230 increases such as the periods P2 and P3, the main controller 210 may control the drain motor 630 to rotate at the second speed W2 lower than the first speed W1.

Meanwhile, when the output current flowing in the drain motor 630 decreases in a state where the speed of the drain motor 630 is the first speed W1 while the water level in the washing tub 120 is kept constant such as the periods P2 and P3, the main controller 210 may control the drain motor 630 to rotate at the second speed W2 lower than the first speed W1.

Meanwhile, while the water level in the washing tub 120 decreases such as the period P1, the main controller 210 may control the speed of the drain motor 630 to be gradually increased from the third speed W3 lower than the first speed W1 and higher than the second speed W2.

Meanwhile, before the period P1 during which the water level in the washing tub 120 decreases, the main controller 210 may control the drain motor 630 to rotate at the fourth speed W4 lower than the third speed W3 and higher than the second speed W2.

Meanwhile, when drainage is initiated such as the time point TO, the main controller 210 may control the speed of the drain motor 630 to be rapidly increased from the fourth speed W4 to the third speed W3.

Meanwhile, in a period during which the speed of the drain motor 630 gradually increases from the third speed W3 such as the period P1, the output current may be substantially constant.

FIG. 12B is an enlarged view of period section of FIG. 12A, and illustrates that the drain motor 630 is driven repeatedly between the first speed W1 and the second speed W2 according to the level of the output current flowing in the drain motor 630.

(a) of FIG. 12B illustrates a speed waveform Wpua of the drain motor 630, (b) of FIG. 12B illustrates an output current waveform Ipu of the output current flowing in the drain motor 630, and (c) of FIG. 12B illustrates a power Ppu consumed by the drain motor 630.

After the drain motor 630 rotates at the first speed W1 before a time point Taa, when the level of the output current flowing in the drain motor 630 decreases, particularly to be lower than the reference level Ire, at the time point Taa, the main controller 210 may control the drain motor 630 to rotate at a speed lower than the first speed W1.

Accordingly, the speed of the drain motor 630 decreases from the time point Taa, and the drain motor 630 may rotate at the second speed W2 at time point Tab.

Next, when the level of the output current flowing in the drain motor 630 increases at time point Tac after the time point Tab, particularly to be higher than the lower limit level Imn, the main controller 210 controls the drain motor 630 to rotate at a speed higher than the second speed W2.

Accordingly, the speed of the drain motor 630 increases from the time point Tac, and the drain motor 630 may rotate at the first speed W1 at time point Tad.

In this way, the main controller 210 may control the speed of the drain motor 630 to be decreased and increased repeatedly until the dewatering is completed.

Accordingly, the drainage can be smoothly performed while reducing the pressure in the vortex chamber ROOM of the drain pump during the dewatering. In addition, noise or vibration resulting from the operation of the drain pump, which may occur when the pressure in the vortex chamber ROOM increases, can be reduced.

Meanwhile, the main controller 210 may control a power of the drain motor 630 when driven at the first speed W1 to be the same, as Pa, as that when driven at the second speed W2, as shown in (c) of FIG. 12B. Accordingly, the converter 410 merely needs to supply a constant power, thereby improving the stability of the converter 410. In addition, since power control is performed, a time required for completion of drainage can be shortened as compared with that when speed control is performed.

Meanwhile, FIG. 1 illustrates a top loading type machine as a laundry treatment machine, but the drain pump driving apparatus 620 according to an embodiment of the present disclosure may also be applied to a front loading type machine, that is, a drum type machine.

Meanwhile, the drain pump driving apparatus 620 according to an embodiment of the present disclosure may be applied to various machines such as dishwashers and air conditioners, in addition to the laundry treatment machine 100.

The drain pump driving apparatus and the laundry treatment machine including the same according to embodiments of the present disclosure are not limited to the configurations and methods of the above-described embodiments, and various modifications to the embodiments may be made by selectively combining all or some of the embodiments.

Meanwhile, a method for operating the drain pump driving apparatus and the laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A laundry treatment machine comprising:
   a washing tub;
   a washing tub motor to rotate the washing tub;
   a drain pump;
   a drain motor to operate the drain pump;
   a converter to output a direct current (DC) voltage;
   an inverter to convert the DC voltage from the converter into an alternating current (AC) voltage based on a switching operation and to output the converted AC voltage to the drain motor;
   an output current detector to detect an output current flowing in the drain motor; and
   a controller to control the drain motor to rotate at a second speed lower than a first speed and then increase the speed of the drain motor after a predetermined time, when the output current flowing in the drain motor decreases in a state where a speed of the drain motor is the first speed while a water level in the washing tub is kept constant,
   wherein the controller controls to supply the same power to the drain motor, when the drain motor is driven at the first speed and when the drain motor is driven at the second speed,
   wherein, while the water level in the washing tub decreases, the controller controls the speed of the drain motor to be gradually increased from a third speed lower than the first speed and higher than the second speed,
   wherein the output current is substantially constant in a period during which the speed of the drain motor gradually increases from the third speed.

2. The laundry treatment machine of claim 1, wherein, before the water level in the washing tub decreases, the controller controls the drain motor to rotate at a fourth speed lower than the third speed and higher than the second speed.

3. The laundry treatment machine of claim 2, wherein, when drainage is initiated, the controller controls the speed of the drain motor to be rapidly increased from the fourth speed to the third speed.

4. A laundry treatment machine comprising:
   a washing tub;
   a washing tub motor to rotate the washing tub;
   a drain pump including a water introduction part into which wash water in the washing tub is introduced, a vortex chamber formed within the water introduction part, and an impeller disposed in the vortex chamber;
   a drain motor operating the impeller;
   a converter to output a direct current (DC) voltage;
   an inverter to convert the DC voltage from the converter into an alternating current (AC) voltage based on a switching operation and to output the converted AC voltage to the drain motor;
   an output current detector to detect an output current flowing in the drain motor; and
   a controller to control the drain motor to rotate at a first speed if the wash water introduced to the vortex chamber is fully filled and a water level in the washing tub is kept constant, and to rotate at a second speed lower than the first speed if the wash water introduced to the vortex chamber is partially filled, and then increase the speed of the drain motor after a predetermined time,
   wherein the controller controls to supply the same power to the drain motor, when the drain motor is driven at the first speed and when the drain motor is driven at the second speed,
   wherein, while the water level in the washing tub decreases, the controller controls the speed of the drain motor to be gradually increased from a third speed lower than the first speed and higher than the second speed,
   wherein the output current is substantially constant in a period during which the speed of the drain motor gradually increases from the third speed.

5. The laundry treatment machine of claim 4, wherein the controller controls the speed of the drain motor to be decreased and increased repeatedly until dewatering is completed.

6. The laundry treatment machine of claim 4, wherein, when the output current flowing in the drain motor increases when the drain motor is driven at a speed lower than the first speed, the controller controls the speed of the drain motor to be increased.

7. The laundry treatment machine of claim 1, wherein, when a level of the output current flowing in the drain motor is lower than or equal to a reference level in the state where the speed of the drain motor is the first speed while the water level in the washing tub is kept constant, the controller controls the drain motor to rotate at the second speed.

8. The laundry treatment machine of claim 7, wherein, when the level of the output current flowing in the drain motor exceeds the reference level while the drain motor rotates at the second speed, the controller controls the speed of the drain motor to be increased after the predetermined time.

9. The laundry treatment machine of claim 1, wherein, while the water level in the washing tub is kept constant, the controller controls the drain motor to be driven repeatedly between the first speed and the second speed based on a level of the output current flowing in the drain motor.

10. The laundry treatment machine of claim 1, wherein the controller controls the speed of the drain motor to be decreased and increased repeatedly until dewatering is completed.

11. The laundry treatment machine of claim 1, wherein, when the output current flowing in the drain motor increases when the drain motor is driven at a speed lower than the first speed, the controller controls the speed of the drain motor to be increased.

12. The laundry treatment machine of claim 1, wherein, when the output current flowing in the drain motor decreases in the state where the speed of the drain motor is the first speed while a speed of the washing tub motor increases, the controller controls the drain motor to rotate at the second speed lower than the first speed.

13. The laundry treatment machine of claim 1, wherein, before the water level in the washing tub decreases, the controller controls the drain motor to rotate at a fourth speed lower than the third speed and higher than the second speed.

14. The laundry treatment machine of claim 13, wherein, when drainage is initiated, the controller controls the speed of the drain motor to be rapidly increased from the fourth speed to the third speed.

15. A laundry treatment machine comprising:
a washing tub;
a washing tub motor to rotate the washing tub;
a drain pump including a water introduction part into which wash water in the washing tub is introduced, a vortex chamber formed within the water introduction part, and an impeller disposed in the vortex chamber;
a drain motor operating the impeller;
a converter to output a direct current (DC) voltage;
an inverter to convert the DC voltage from the converter into an alternating current (AC) voltage based on a switching operation and to output the converted AC voltage to the drain motor;
an output current detector to detect an output current flowing in the drain motor; and
a controller to control the drain motor, while a water level in the washing tub is kept constant, to be driven repeatedly between a first speed and a second speed lower than the first speed based on a level of the output current flowing in the drain motor,
wherein the controller controls to supply the same power to the drain motor, when the drain motor is driven at the first speed and when the drain motor is driven at the second speed,
wherein, while the water level in the washing tub decreases, the controller controls the speed of the drain motor to be gradually increased from a third speed lower than the first speed and higher than the second speed,
wherein the output current is substantially constant in a period during which the speed of the drain motor gradually increases from the third speed.

* * * * *